United States Patent [19]

Butts

[11] Patent Number: 4,568,925
[45] Date of Patent: Feb. 4, 1986

[54] SUBTERRANEAN TANK LEAK DETECTION SYSTEM AND METHOD

[76] Inventor: Nicholas E. Butts, 1002, Alpine Ave., Ontario, Canada, K2 B5S1

[21] Appl. No.: 514,615

[22] Filed: Jul. 18, 1983

Related U.S. Application Data

[63] Continuation-in-part of Ser. No. 335,818, Dec. 30, 1981, abandoned.

[30] Foreign Application Priority Data

Jan. 9, 1981 [CA] Canada .................................. 368169

[51] Int. Cl.⁴ ........................ G01M 3/40; G08B 21/00
[52] U.S. Cl. ..................................... 340/605; 73/49.2
[58] Field of Search ................... 73/40, 40.5 R, 49.2, 73/49.3; 340/605, 620

[56] References Cited

U.S. PATENT DOCUMENTS

| | | | |
|---|---|---|---|
| 3,564,526 | 2/1971 | Butts . | |
| 3,995,472 | 12/1976 | Murray | 73/40 |
| 4,161,957 | 7/1979 | Schoellkopf | 73/40.5 R X |
| 4,288,653 | 9/1981 | Blom et al. | 73/40.5 R X |
| 4,305,068 | 12/1981 | Klein | 73/40 X |

FOREIGN PATENT DOCUMENTS

| | | | |
|---|---|---|---|
| 690249 | 7/1964 | Canada . | |
| 775758 | 1/1968 | Canada . | |
| 978614 | 11/1975 | Canada . | |
| 1120131 | 3/1982 | Canada . | |
| 2329525 | 1/1975 | Fed. Rep. of Germany | 73/49.3 |
| 135689 | 11/1978 | Japan | 73/40 |
| 155886 | 12/1979 | Japan . | |
| 6133 | 1/1981 | Japan | 73/40 |

*Primary Examiner*—Howard A. Birmiel
*Assistant Examiner*—Joseph W. Roskos
*Attorney, Agent, or Firm*—Cushman, Darby & Cushman

[57] ABSTRACT

An improved system for containment and detection of leakage of petroleum products from subterranean tanks or lines is disclosed wherein the tanks or lines are provided with a leak sensing means positioned adjacent the tank, and the tank or line together with the leak sensor is enclosed in an impervious enclosure which is sealed about the tank or line to prevent actuation of the leak sensor except due to leakage from the tank. In a preferred form the leak sensor is housed in a perforated duct which extends through and is sealed within the enclosure permitting access to the leak sensor and the interior of the bag in the event that a leak is detected. A preferred material for use in making the enclosure is welded high density polyethylene (HDPE).

20 Claims, 16 Drawing Figures

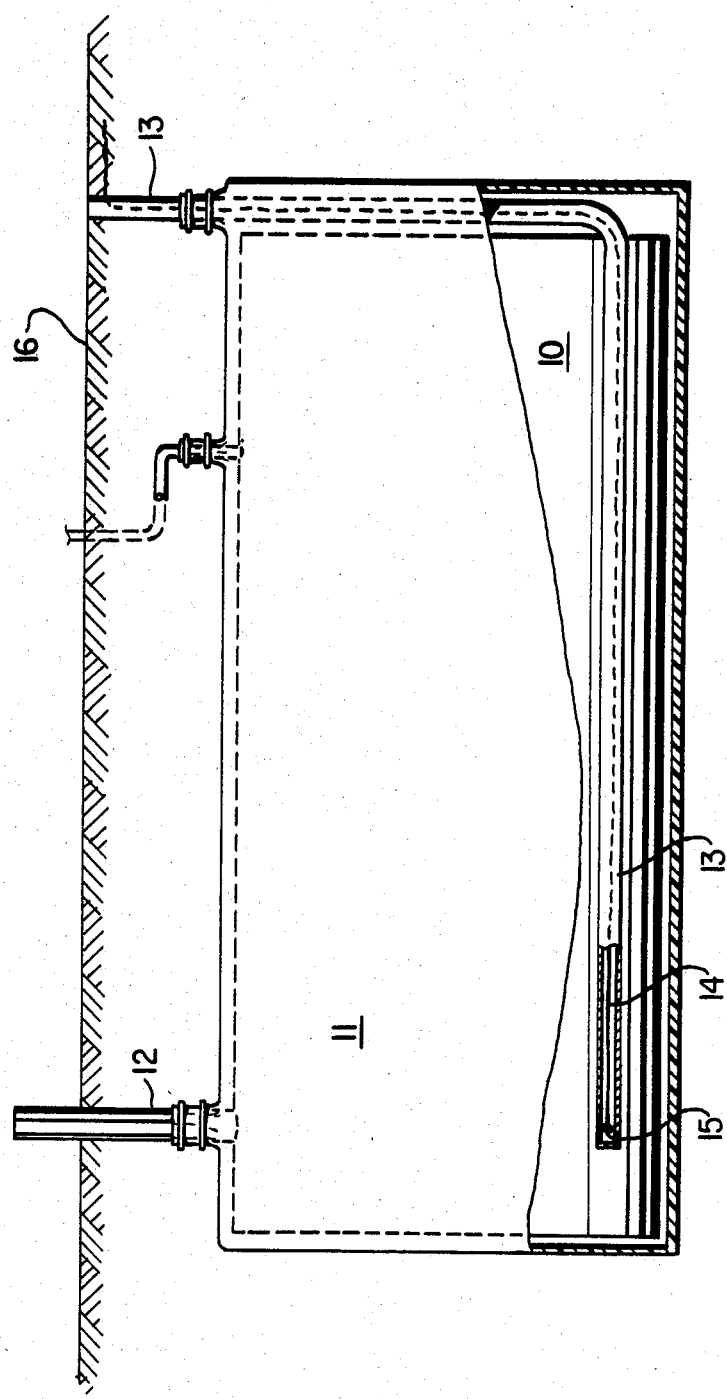

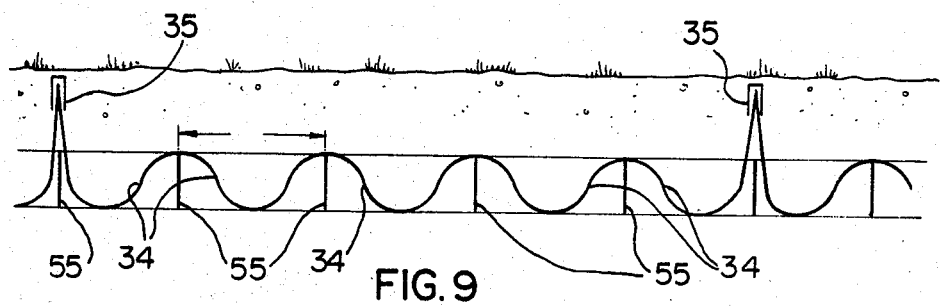
FIG. 9
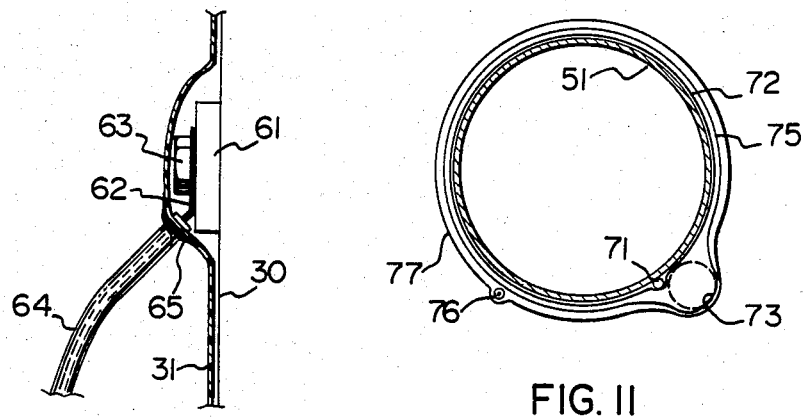
FIG. 10
FIG. 11
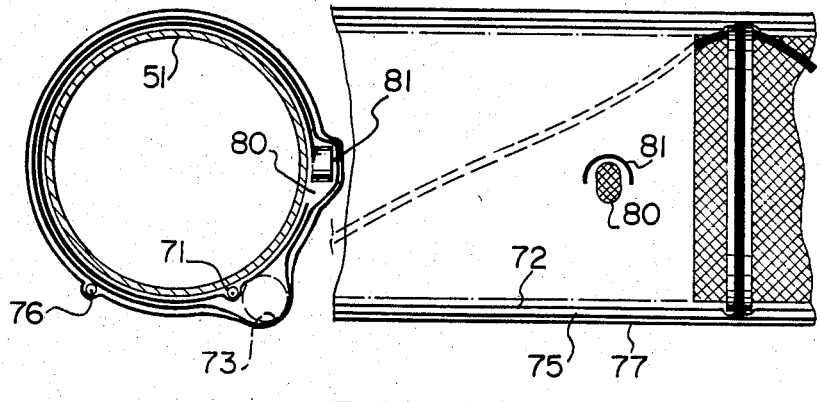
FIG. 12

SUBTERRANEAN TANK LEAK DETECTION SYSTEM AND METHOD

PREAMBLE

This is a continuation-in-part of my parent application, Ser. No. 335,818 filed Dec. 30, 1981 and abandoned in favor hereof.

The present invention relates to the field of leak detection, and is concerned with improvements in containment and detection of leaks from underground containers including tanks and pipelines, for example tanks used for storage of fuels or other petrochemicals. Many thousands of fuel storage tanks are located underground, for example in service stations, and leakage from these tanks is a continuing concern. Undetected leakage from such tanks is wasteful in the loss of a non-renewable energy source, and can also create hazards to public safety where leakage occurs over an extended period of time resulting in the contamination of subsurface earth formations or ground water sources, or by leaking into storm sewers, to create an explosion hazard.

Frequently where new subterranean tanks or pipelines are installed to replace failed ones, the ground has already been contaminated by previous leakage or spillage of fluids, so that the installation of leak sensing devices adjacent the new tank or pipe will result in false indication of leakage. What is required is a leak detection and containment system which is insensitive to contamination of the environment resulting from leakage not associated with the container to be protected, and is similarly immune to spillage of products during refilling or when products are drawn from the container during use.

All of the above criteria are met by the improved method and system of the present invention in which leakage of petroleum products from a subterranean container is detected by providing the container with a leakage sensor positioned adjacent the container and enclosing the sensor together with the container in an impervious enclosure which is then sealed to prevent spillage of petroleum products or soil contamination from causing erroneous leak indications to be generated, and also effectively contains leakage from the container until repair or replacement can be effected.

In a preferred form, the present invention provides a method of containing and detecting leakage from a subterranean tank containing a petroleum product such as gasoline or heating oil, by providing adjacent the tank an electrical leak detecting cable of the type that has an insulator that is subject to degradation by the petroleum product, enclosing the cable and tank together in an enclosure impervious to the product, sealing the enclosure to prevent the ingress of the product due to accidental spillage or from other sources of the product, and connecting the cable to an electrical sensor whereby leakage from the tank into the sealed enclosure is detected by the cable and electrical sensor.

In accordance with a preferred form of the invention, the leak sensor is positioned in a perforated duct inside the enclosure adjacent the tank so that leakage from the tank will penetrate the duct, and be detected by the leak sensor. The perforated duct thus can be used to gain access to the leak detection cable.

Conveniently, both ends of the cable may extend outside the enclosure (in suitable protective sleeves), one end being connected to a suitable monitor, for example the Orbmah Monitors Inc. model M105B. With this configuration, the cable may be replaced after destruction by leakage by using the destroyed cable to pull a new cable through the duct, after the source of leakage has been pinpointed and the leaking container repaired and resealed. For example, in large tanks, repairs are frequently made from inside the tank, and the enclosure may be cleansed using a flushing technique, with detergents to rehabilitate the interior of the enclosure, thus avoiding the necessity of excavation.

In the drawings which illustrate embodiments of the present invention and its use, FIG. 1 is a vertical longitudinal section through a typical cylindrical subterranean tank protected in accordance with the present invention, FIG. 2 is a transverse vertical section of the tank of FIG. 1, FIG. 3 is a detailed view of the filler pipe in FIG. 1, FIG. 4 is a view partly in section of an alternative form of enclosure and leak detection system in accordance with the invention, FIG. 5 is a detailed view on the line A—A of FIG. 4.

FIG. 9 illustrates a length of pipeline protected in accordance with the invention, FIG. 10 illustrates the application of cathodic protection to a pipe or tank.

FIG. 11 illustrates a further form of the invention for protecting pipeline using triple sleeves.

FIG. 12 illustrates a length of pipeline protected with the triple sleeve system, and includes a section of the pipe illustrating the overflow system.

DETAILED DISCLOSURE

Figure 3:
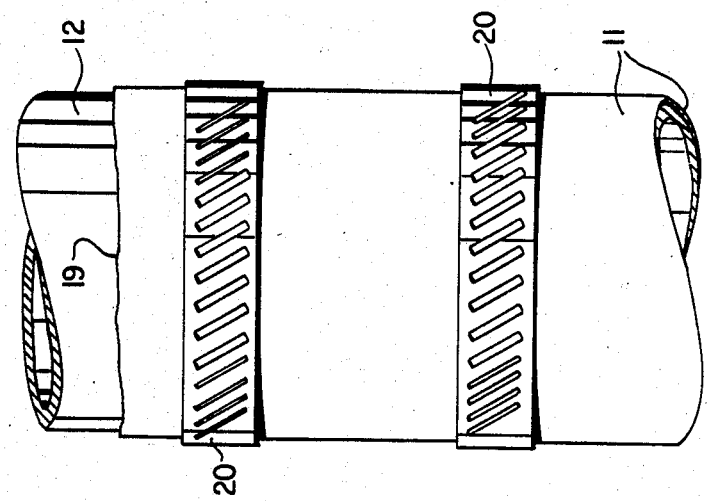

In FIG. 1 there is shown a tank 10 which is sealed within a bag 11, and extending through the seal is a fill pipe 12 and a leak detection duct 13. Located within the duct 13 is a leak sensor cable 14 terminated with a resistor 15. The entire installation is below ground level 16.

Figure 2:
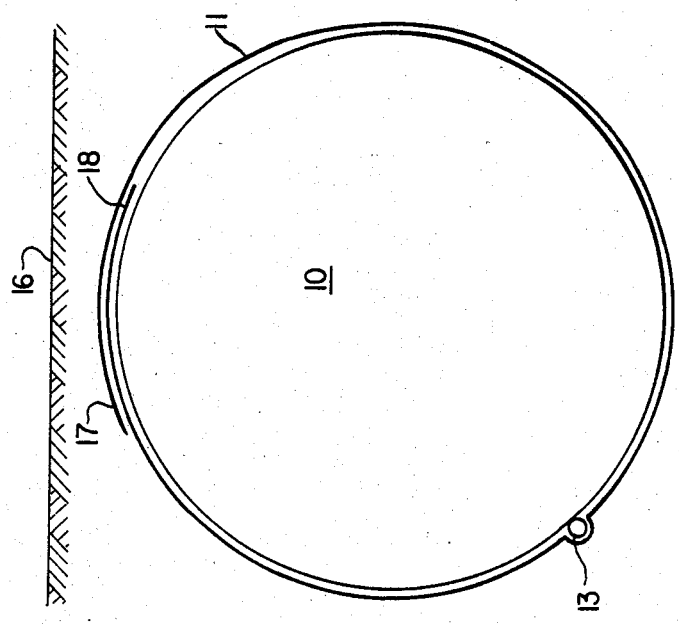

In order to seal the tank 10, and duct 13 in the bag 11 and as illustrated more clearly in FIG. 2, the end of the flaps 17 and 18 of the bag 11 are folded over and may be sealed together with a commercially available HDPE weld to complete the installation of the bag.

FIG. 3 illustrates one way in which the bag 11 may be sealed to the filler pipe 12. As illustrated the bag 11 is drawn up around the filler pipe 12 to a point 19, and screw clamps 20 may be used together with a suitable sealer to complete the sealing of the bag 11 about the filler pipe 12. Clay might be added to completely isolate this whole section from contaminated ground.

Several advantages flow from the use of the system of the present invention. A principal advantage is that it is now possible to use a bare steel tank in an underground location without premature failure of the tank due to corrosion. Such bare steel tank is the least expensive container for storing fuels, but has not been used because of leakage caused by corrosion. The tank 10 being entirely sealed in the bag 11 is completely isolated from any of the corrosive effects due its environment. One form of the bag material particularly suitable for use with the invention is made from high density polyethylene (HDPE) or a nylon reinforced vinyl sold under the trade mark Herculite.

HDPE may of course be welded with commercially available plastic welding tools, available for example from Munsch Chemiepumpen GmbH.

Herculite brand of nylon reinforced vinyl sheeting is a strong inert material, totally uneffected by petroleum products, and may be seamed by sewing, by the use of adhesives or by electronic welding. Sewn seams may of course be waterproofed as taught by the supplier of the Herculite brand fabrics, Herculite Protective Fabrics Corporation, New York, N.Y. 10010 U.S.A. A suitable adhesive for joining such fabrics is available from the same supplier, and is sold under the trade name CVV.

In normal use, all metallic connections to the bare steel tank must be made with electrical insulating isolators in each connection. Such isolators are commonly in use at the present time with known fuel storage tanks. The material used for the bag must also be an electrical insulator.

The leak detection duct 13 used in FIG. 1 and FIG. 3 can be formed for example from one inch diameter perforated HDPE pipe.

After installation the bag is sealed around the top of the tank and all piping including the leak detection duct, so that no spills will find their way into the space between the tank and the bag. Any product then getting into this space must come from the tank where its presence will activate the sensor cable alerting the responsible person that the tank has developed a leak.

Many advantages are realized using the system of the present invention. First of all a 24 hour a day 365 day watch is maintained on the integrity of the tank and there is no need for independent test or other special procedures such as have been proposed and are presently in use in association with underground fuel storage tanks. Because the tank is isolated from the soil by the insulated bag there is no need for cathodic protection or other steps or measures to reduce or prevent corrosion. Further in accordance with the invention it has been found that a more economical solution to the problem of fuel storage and leak detection is provided. Cathodic protection can easily be applied using cathodic protection conductors with a HDPE insulation that can be welded to the same material which comprises the bag.

The use of the duct containing the sensor cable also provides a significant further feature for the invention since should the petroleum product for any unforeseen reason other than by a leak get into the space between the tank and the bag it is quite simple to circulate water with or without detergent added through the duct and flush out the product and replace the sensor cable.

There is no question that large spills could of course cause false alarms in the leak detection system, but the judicial placing of ducts away from filler caps and suitably protecting the filler cap area to ensure that the small spills which occur at filling to not percolate into the soil will virtually eliminate this source of false leak signals.

The system of the present invention provides a significant further advantage in the event of a leak in that the enclosure is capable of retaining the leak and avoiding unnecessary contamination of the surrounding environment. With the system of the present invention underground storage tanks can be maintained in a controlled environment free from moisture and harmful chemicals in the surrounding ground. By controlling the Ph and moisture in the bag containing the tank, corrosion of tanks can be kept to a minimum. Thus it is no longer necessary to use expensive fiber glass storage tanks which are vulnerable to solvents in the ground water.

A further advantage of the invention is that in the event of a leak or sudden failure of the tank any product in the tank will not be lost to the environment where it is able to pollute the surrounding ground water. The enclosure retains all of the lost product within its walls so that it may be removed safely and without contamination of the product or of the surrounding area.

The material used for the bag of the present invention is strong, water and oil resistant. The bag is formed from three prefabricated sections; two end caps which are of the desired diameter with a three inch lip and one body sheet the same length as the tank, as wide as the circumference of the tank plus two feet. The bag is welded together on site using a commercially available HDPE welding process. In a typical installation, the site excavation is dug in the normal manner with a six inch layer of compacted sand placed on the bottom. The leak detection duct 13 may be laid in the form of a letter L or preferably the letter U with the vertical end(s) rising to the ground level 16, while a horizontal run is along the bottom, right on the material of the bag.

After the tank 10 and the leak detection duct have been installed within the bag 11 the bag can be welded together. Prior to sealing it is also possible to add chemicals in the bottom of the bag to protect the steel storage tank to inhibit corrosion. When the top flaps are sealed, holes are cut for fill pipes, vent pipes and pump pipes. Special sleeves or "chimneys" may be made for these pipes and welded to the bag, so that all connections are protected to the ground surface as illustrated in FIG. 3. These sleeves may be clamped with a screw clamp 20 approximately six inches below the ground level 16, filled with silicon grease and then sealed with a second clamp as illustrated in FIG. 3. Impervious clay can then be used to further isolate this area to prevent liquids from entering the bag.

After sealing the upper end of the top flap 17, the bag 11 should be completely sealed so that no moisture is able to get into the liner where it is able to affect the tank 10.

Where the leak detection duct 13 comes to ground level 16 a man-hole (not shown) may be placed so that it will be slightly below final grade and not affected by any surface equipment such as snowplows or the like.

A sensor cable 14 is installed within the leak detection duct 13. Such sensor may be either a gas detector or a sensor cable. A suitable form of cable is that sold by Leak X Detection Devices Limited of Ottawa, Canada as Linear system and as disclosed in Canadian Pat. No. 775,758 of Jan. 9, 1968 to E. O. Butts (corresponding to U.S. Pat. No. 3,564,526) and Canadian Pat. No. 978,614 of Nov. 25, 1975 to Wolkowski, contents of all of which are incorporated hereinto by reference. As disclosed therein, two copper conductors are separated by insulation materials which are subject to degradation upon contact with petroleum products such as gasoline or heating oil. Sufficient degradation allows the copper conductors to come into contact with each other and thereby energize an alarm or other type monitor. An alternative would be the use of a gas sensor head or sniffer installed in the duct and wired to an alarm.

It is also within the scope of the invention to preassemble the bag, duct, sensor, and tank to factory seal the preassembled unit, which may then be installed in a suitable excavation, and connected to filler pipes and leak detection monitors.

Many of the advantages are obtained in the use of a system of the present invention.

1. The tank is now in a moisture and chemical free controlled environment.
2. Leak detection is fast and accurate.
3. Leak detection is not vulnerable to spills or existing contamination in the surrounding ground.
4. Leaks are retained so that expensive clean-up spills can be avoided.
5. Leak clean-up is fast, easy and thorough.
6. Leaking tanks can be accurately identified.
7. Old steel tanks can be reclaimed and used again since corrosion can now be controlled. This makes retrofitting older gas stations for example a feasible solution because their tanks will probably not require changing but can merely be excavated, fitted with a bag, duct and sensor and reinstalled. Additionally all fittings and piping are enclosed in the bag so that these can be monitored for leaks also.

It is estimated that the cost of installing the applicant's leak detection system would add about 30 percent to the cost of a basic installation of a bare steel tank. As against this, however, is the fact that a bare steel tank would be subject to corrosion depending upon the nature of the soil in which it is buried, and it is not equipped with any adequate means for detecting leakage except by use of conventional inventory control practices. However, the savings involved in early leak detection together with the extended life of the tank clearly indicates that the cost of the applicant's improved leak detection system should be recaptured during the life of the tank.

Figure 4:
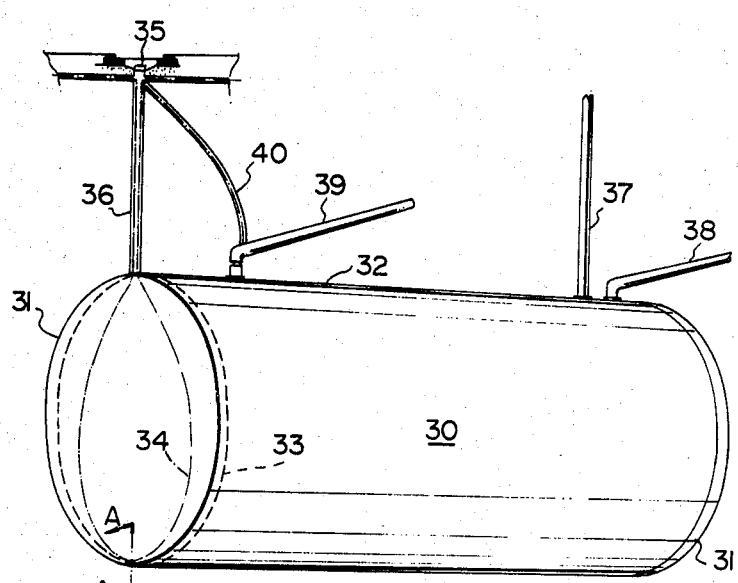
Figure 7:
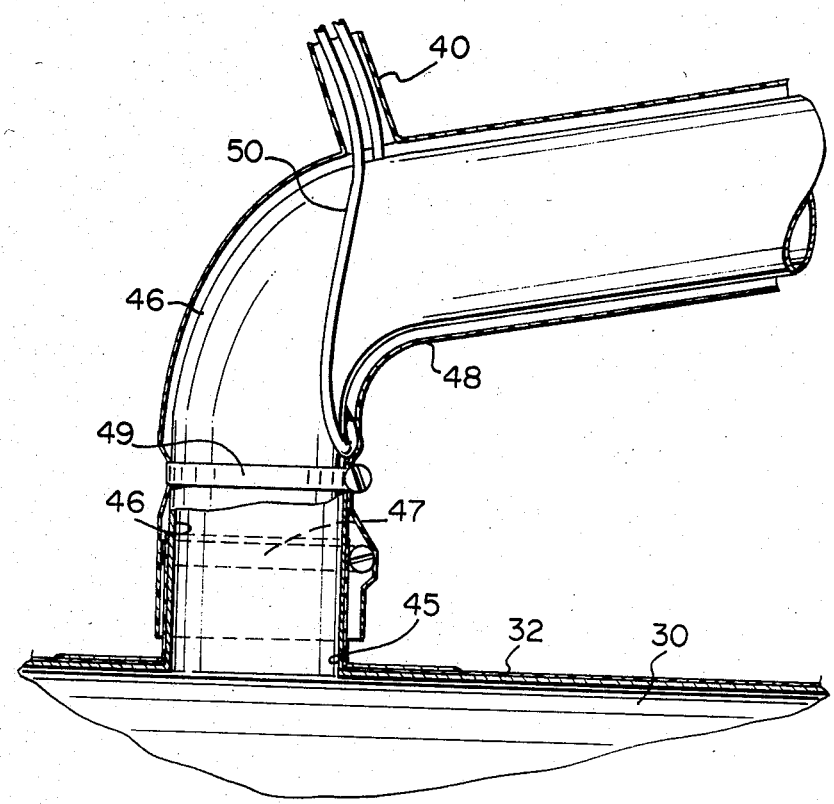
FIG. 7 is a detailed view of the Pump Piping of FIG. 4.

FIG. 4 illustrates an alternative form of enclosure for use with a bare steel tank, particularly useful for example in the service station environment. As illustrated the tank 30 is enclosed in a high density polyethylene enclosure consisting of a pair of molded end caps 31 and a body sheet 32. The end of the cylindrical tank 33 is spaced from the inner end of the end cap 31, to provide a space for the applicant's preferred one inch perforated duct containing the leak detection cable 34. It will be noticed the leak detection cable and duct 34 extend to the bottom edge of the tank 30 to provide the earliest possible sensing of any leakage which may occur from within the tank. The duct 34 is connected to a test point at the surface 35 by an impervious HDPE chimney fitting 36 welded to the end cap 31. The fill pipe 37 and vent pipe 38 are both encased in HDPE chimney fittings similarly welded to the body sheet 32. The piping to pumps 39 is similarly protected with an appropriate chimney fitting of HDPE, and in addition in accordance with a further feature of the invention may be provided with leak detection cable for sensing leaks in the piping to the pumps which leak detection cable may be connected via a further impervious HDPE pipe 40 to the test point 35. The detail of the interconnection of the piping to pumps 39 and the pipe 40 is illustrated in FIG. 7.

Figure 5:
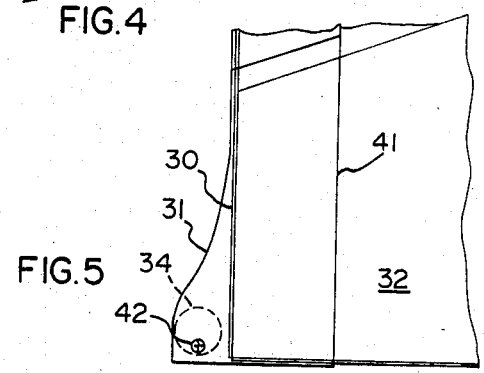

FIG. 5 illustrates a detail of the junction between the end cap 31 and the body sheet 32 at the point A—A of FIG. 4. As illustrated, the end cap 31 overlaps the body sheet 32 and is welded thereto with an HDPE weld at 41. The perforated duct 34 containing the sensor cable 42 passes along the bottom edge of the end cap 31 such that any leakage from the tank 30 will contact the sensor cable 42 at the earliest opportunity, to give indication of such a leak.

Figure 6:
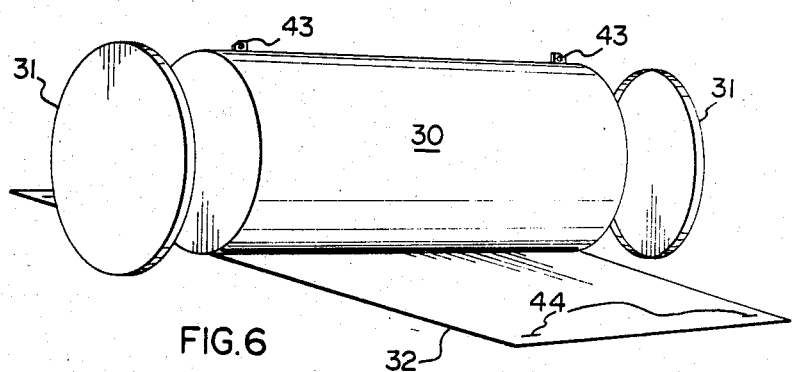
FIG. 6 is a perspective view illustrating the assembly of an alternate form of leak detection enclosure.

FIG. 6 illustrates the assembly of the applicant's enclosure to a typical gasoline storage tank. Such tank 30 is equipped with lifting lugs 43 for lifting and positioning the tank. In a conventional installation the body sheet 32 is positioned in the excavation in which the tank 30 is to be installed, the tank is placed on the body sheet 32, and the ends of the sheet are then wrapped around the tank, appropriate slits 44 being provided to accommodate the lifting lugs 43. The body sheet 32 is then welded to itself with the tank inside the sheet. Subsequently the end caps 31 containing the perforated duct 34 and leak detection cable 42 are mounted on the ends of the tank, and the end caps 31 are welded to the body sheet using known high density polyethylene welding techniques. With the tank entirely sealed in the high density polyethylene container all leakage from the tank is completely prevented.

A preferable material for use as the body sheet and end caps is high density polyethylene utilizing special welds, and the thickness of the sheet material can vary between 15/1000 and 60/1000 of an inch depending on the application.

Preferably the tank components are prefabricated to the tank dimensions and shipped to the tank manufacturer where the components are temporarily taped together onto the tank to protect the tank during transportation. On site the container is removed and the tank may be pressure tested according to local requirements. The leak detection cable is fitted into the end fittings, and the entire enclosure is welded together on the tank prior to burial. The piping to the pumps, filler pipes and vent pipes can also be fitted with separate leak detection systems as herein after described. Special chimney fittings are designed to fit over the tank piping and are clamped to the pipes with the bases welded to the enclosure so as to prevent liquids from entering the bag at these locations. All wiring connections are done after backfilling so as to allow the tanks and piping systems to be monitored by a single monitor.

FIG. 7 illustrates a detail of FIG. 4 in which a tank 30 sealed within a body sheet 32 is provided with a chimney fitting 45 also welded to the body sheet 32 through which piping to the fuel dispensing pumps is passed. As illustrated in FIG. 7 the chimney fitting 45 is clamped to the pipe 46 by a clamp 47, and a further HDPE sleeve 48 is fitted over the piping 46 and the chimney 45, and is clamped by a screw clamp 49 about the piping 46. Within the sleeve 48, a further leak detection cable 50 contained within a non-perforated duct 40 is looped around the piping 46 just above the clamp 49, to provide a mechanism for detecting leaks in the piping 46 which might otherwise go undetected, or which if clamps 47 and 49 were not provided on the piping 46, leak back into the enclosure to give an erroneous detection of a leak in the tank per se.

Figure 8:
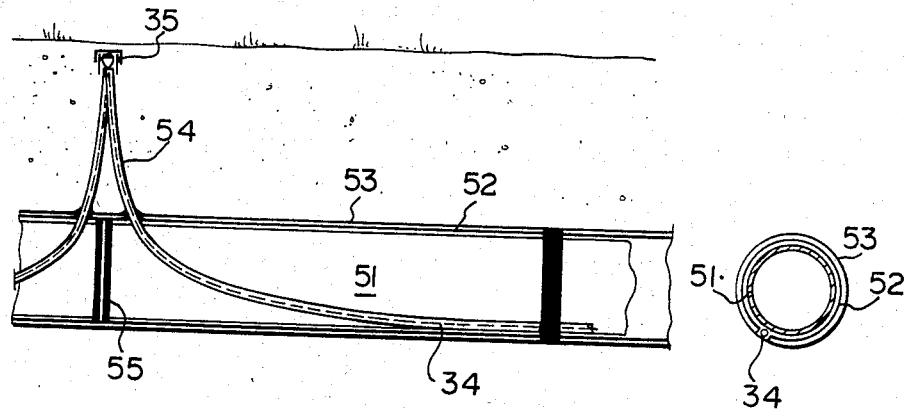
FIG. 8 illustrates the application of the invention to a pipeline using two concentric sleeves surrounding the pipe and leak detection duct.

FIG. 8 illustrates the application of the principals of the present invention to the protection of a pipeline system in which a pipeline 51, typically composed of steel pipe is encased in concentric inner and outer sleeves 52 and 53 of high density polyethylene. Typically the inner sleeve might be formed of 15 mil material and the outer sleeve of 40 mil material. As before a perforated duct 34 containing a leak sensor (not shown) extends along the pipe 51, and is connected to a test point 35 via a non-perforated duct 54 welded to each of the inner and outer sleeves which in turn are welded about the pipeline 51. The perforated duct 34 is positioned inside the inner sleeve, adjacent the pipe 51, and by virtue of its location is adapted to detect leakage from the pipe 51 almost at once the pipe commences to leak.

An inner collar 55 is positioned beneath the test point 35, and in conjunction with an outer collar compressing the inner collar 55 serves to prevent the migration of leakage along the pipe 51.

To install the leak detection and containment system as illustrated in FIG. 8, the layers of high density polyethylene sheet 52 and 53 are unrolled along the bottom of the trench and the internal collars 55 placed at the appropriate locations. These collars 55 act to compartmentalize the pipeline to prevent leaking liquid from migrating too far within the sleeve. The two sleeves are provided to allow an inner thin sleeve to be clamped tightly to the pipe to prevent fuel migration while a much thicker outer sleeve acts to protect the inner sleeve, the perforated duct and the pipe itself. The outer sleeve may for example be similar to the material called "rock sheeting" used to protect pipelines during burial. The pipe 51 is then laid into the trench on top of the layers 52 and 53. The leak sensor cable in its perforated duct 34 is laid beside the pipe and looped in such a way that leaking product will not migrate past the collars. The collars can be placed at any desirable interval with ten meters being a suggested normal spacing. The inner sleeve is folded up over the pipe and welded together and straps designed to tighten the sleeve about the collars are applied, and the outer sleeve is then pulled together and welded. The cable is brought out of the sleeve at desirable intervals through non-perforated duct 54 passing through suitable welds in the sheeting 52 and 53. The whole system is designed so that the cable can be replaced without having to excavate. One can simply pull the old cable out at the same time pulling the new cable in. In the event of a leak of course a new piece of cable can simply be spliced into the system at the same time that the pipeline is repaired.

FIG. 9 illustrates a typical pipeline installation including a plurality of test points 35 between which the perforated duct 34 extends, the duct being positioned such that the duct comes to the top of the pipe at approximately ten meter intervals, at which places collars 55 are provided as discussed previously serving to contain any leakage within a short length of pipe.

FIG. 10 illustrates the application of cathodic protection to a tank or pipe positioned in an enclosure in accordance with the invention. The tank or pipe 30 is provided with a standard cathodic protection fitting 61 to which a cathodic protection conductor 62 is fastened by a bolt 63. The conductor 62 is coated with a high density polyethylene (HDPE) coating 64, and where the conductor 62 passes through the enclosure, for example an end cap 31 the insulation on the cathodic protection wire 62 is welded to the enclosure by means of a weld 65.

It will be appreciated that the system of the present invention specifically lends itself to replacement of the sensor cable without any excavation, and the system can be filled with water, causing the petroleum product to float out through the test point. The water may be pumped out from the system, and a new cable installed and the system reactivated. This technique is particularly attractive in the case of large tanks, which are frequently repaired from the inside for example by rewelding previously cracked welds, or welding plates over leak locations.

Further, leak in a pipeline may readily be located after an alarm by taking a resistance measurement on the sensor cable. With a known resistance of conductors in the cable a calculation can readily be made to determine the distance from the test point nearest the leak which of course causes a short-circuit in the sensor cable.

FIGS. 11 through 16 illustrate a modified form of protection for pipeline systems particularly adapted to extremely environmentally sensitive areas such as airports. Frequently airports are provided with a hydrant re-fuelling system, comprising a number of underground pipelines, connected to vertical risers or hydrants, and from which fuel may be pumped, or obtained under pressure, for re-fuelling aircraft. There is a need both for rapid leak detection, and leak containment in such an airport hydrant system. FIG. 11 illustrates a cross-section of a pipe from such a system, comprising a steel pipe 51, adjacent which a first perforated duct 71 is positioned. The duct 71 usually contains a leak sensor.

The pipe 51, which may for example be a 24 inch diameter pipe is then wrapped in a first high density polyethylene sheet 72 for example of 0.01 inch thickness, and this sheet is pulled tight to the pipe and welded in place using high density polyethylene welding techniques. A further perforated duct 73 is positioned immediately outside the enclosure 72, and serves to collect fuel in the event of a leak from the pipe for purposes which will be described herein after. A second concentric sheet 75, for example of 0.040 inch HDPE is positioned about the duct 73 and the pipe 51, drawn up and sealed with an HDPE weld. A second perforated duct 76 containing a second leak sensor cable is positioned outside the sheet 75, and a final exterior sheet 77 is wrapped around all of the foregoing components and sealed in place. Typically the sheet 77 may be formed of 0.040 inch HDPE. This system provides three layers of high density polyethylene enclosure and two leak cables as well as an additional perforated duct for drainage of any leakage. As illustrated in FIG. 12, the inner sleeve 72 is provided with a series of perforations 80 which permit the overflow of leakage from the inner sleeve 72 into the second sleeve 75. The perforated duct contained within the second sleeve 75 is therefore able to receive any leakage from the inner sleeve 72 which may occur. The inner sleeve being a 10 mil high density polyethylene sleeve with collars placed at desired intervals, as aforesaid, is designed to entrap leaking product and allow it to come into contact with the leak sensor cable positioned along the pipe. As previously discussed the positioning of the cable in a serpentine fashion about the pipe is to prevent leaking product from traversing the entire pipeline. The inner sleeve 72 is provided with holes 80 and overflow collars 81 which are designed to allow leaking product to get out of the thin inner sleeve and migrate into the second sleeve. Inside the second sleeve is a further one inch perforated HDPE duct designed to transport the product to a holding tank or overflow system as explained herein after. The third sleeve 77 is to ensure the integrity of the second sleeve 75. As with all embodiments of this invention the system is designed such that cable replacement and flushing out of petroleum product from the system can be accomplished without excavation. Leak location can easily be detected to the nearest ten meter section between collars.

Figure 13:
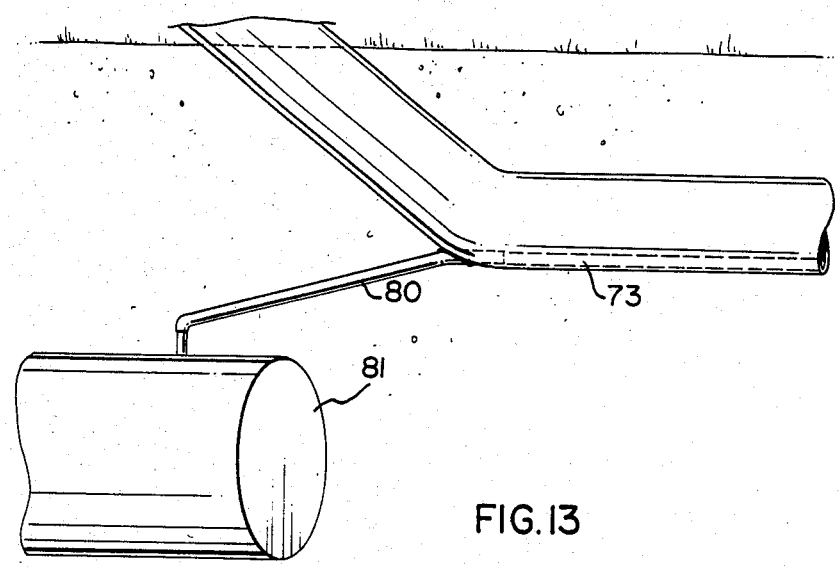
FIG. 13 illustrates the collection of overflow from a pipeline.

FIG. 13 illustrates a pipeline pursuant to FIG. 11 in which the perforated duct 73 is connected to a sealed duct 80 and to an overflow holding tank 81, provided with the applicant's leak sensor and containment system. In this fashion any leakage which enters the duct 73 due to leakage in the pipeline is drained through the pipe 80 into the tank 81 both of which in turn may of course be provided with the applicant's leak containment and detection system.

Figure 14:
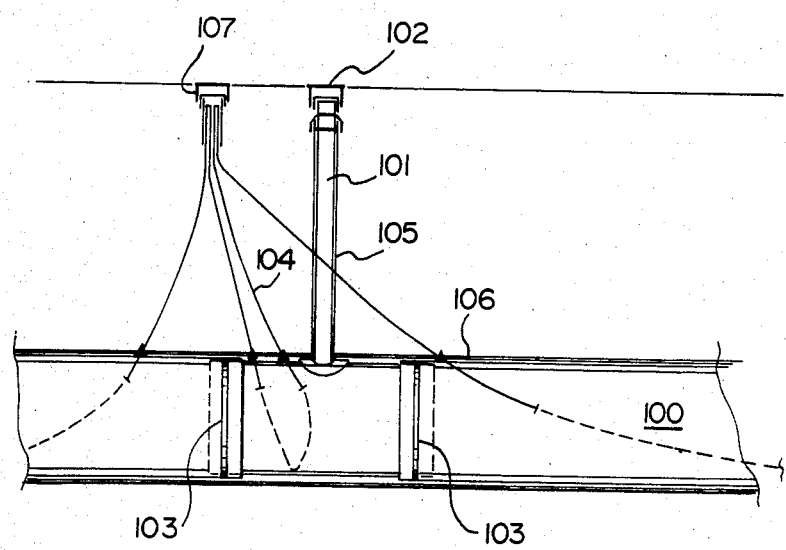
FIG. 14 illustrates a detail of the electrical connections to the detection system for a pipeline.
Figure 15:
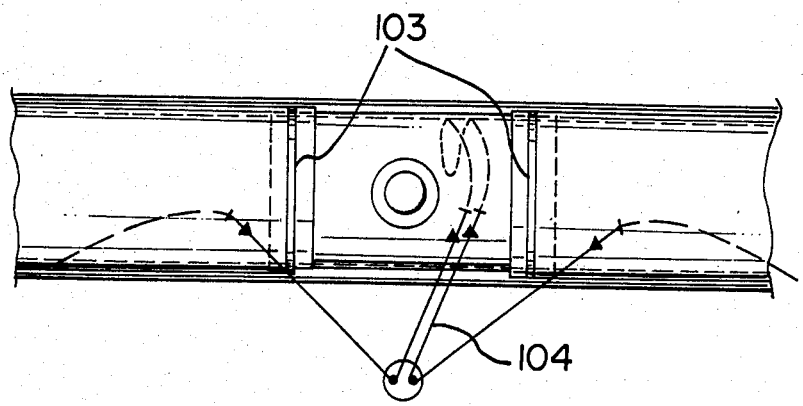
FIG. 15 is a plan view of the details of FIG. 14.
Figure 16:
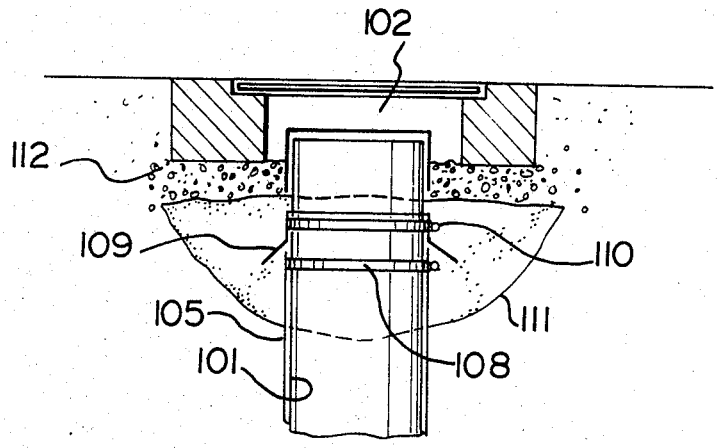
FIG. 16 is a vertical section illustrating the detail at a man-hole for a pipeline leak detection system.

FIGS. 14, 15 and 16 illustrate the hydrant section of an airport piping facility. The leak detection system has been specially modified to incorporate the problem areas associated with hydrants, such as the riser pipes. Thus a pipeline 100 provided with a triple sleeve system as previously described in relation to FIGS. 11 through 13 is further provided with a riser or hydrant 101 extending to a man-hole 102. Collars 103 fitted to the pipe define a hydrant section which is provided with its own leak detection cable 104. The riser or hydrant 101 is also provided with a chimney fitting 105 welded to the external sleeve 106 of the leak detection and containment system. The leak sensor cables are fed to a test point 107 from which access may be gained to the segments of leak detection cable so that leaks may be readily pinpointed as required.

In FIG. 16 the surface man-hole 102 is illustrated in section. The chimney fitting 105 is fastened to the riser 101 by means of a screw clamp 108, and an additional flashing 109 of HDPE is fastened above the upper end of the chimney flashing 105 and secured by a clamp 110. Impervious clay 111 is packed around the top of the chimney fitting, to prevent the migration of spilled fuel clamps 108 and 110. Porous gravel 112 is provided above the clay 111 to rapidly lead any spillage away from the top of the clay pack.

I claim:

1. In a method of detecting and containing leakage from a subterranean container such as a tank or pipeline containing a liquid petroleum product such as gasoline or heating oil, the improvement comprising:
   positioning leak sensing means adjacent said container, said leak sensing means including at least two electrical conductors separated by insulation which is subject to degradation by said liquid petroleum product,
   enclosing said leak sensing means and said container together in an enclosure impervious to said product,
   sealing said enclosure to contain leakage from within said container and to prevent the ingress of petroluem products due to accidental spillage or from other sources of petroleum products,
   burying said enclosure containing said container and said leak sensing means,
   connecting said leak sensing means to means for remotely detecting changes in the electrical characteristics of said leak sensing means due to degradation of said insulation, and
   detecting said degradation due to leakage from said container into said enclosure,
   wherein said leak sensing means is positioned in a perforated duct inside said enclosure.

2. In a method of detecting and containing leakage from a subterranean tank containing a petroluem product, such as gasoline or heating oil, the improvement comprising:
   positioning adjacent said tank an electrical leak detecting cable of the type having insulation which is subject to degradation by said petroleum product,
   enclosing said cable and said tank together in an enclosure impervious to said product,
   sealing said enclosure to contain leakage from within said tank and to prevent the ingress of said product due to accidental spillage or from other sources of said product,
   burying said enclosure containing said tank and said leak sensing means,
   connecting said leak detecting cable to monitoring means sensitive to changes in the electrical characteristics of said insulation due to degradation of said insulation, and
   detecting said degradation due to leakage from said tank into said enclosure,
   wherein said electrical leak detecting cable is positioned in a perforated duct inside said enclosure.

3. A method as claimed in claim 1 or 2, wherein said enclosure is formed from high density polyethylene.

4. A method as claimed in claim 1 or 2 including removing air trapped in said enclosure prior to sealing said enclosure.

5. A method as in claim 1 or 2, wherein said enclosure contains chemical corrosion inhibitors.

6. A method as in claim 1 or 2, in which said container is a bare steel container.

7. A method as claimed in claim 1 or 2, wherein said enclosure is formed of reinforced oil impervious plastic.

8. A method as claimed in claim 1 or 2, wherein said enclosure is formed from high density polyethylene.

9. A method as claimed in claim 1 or 2 wherein said enclosure is formed from high density polyethylene.

10. A method as claimed in claim 1 or 2 including removing air trapped in said enclosure prior to sealing said enclosure.

11. A method as in claim 1 or 2, wherein said enclosure contains chemical corrosion inhibitors.

12. A method as in claim 1 or 2, in which said tank is a bare steel tank.

13. A method as in claim 1 or 2, wherein said enclosure is formed of reinforced oil impervious plastic.

14. In a system for detection and containment of leakage of a petroleum product from a subterranean tank, the combination with said tank of:
   leak sensing means positioned adjacent said tank and being capable of sensing said petroleum product, said leak sensing means comprising a twisted pair of electrical conductors, each insulated with an insulation degradable by said petroleum product, the ends of said pair of conductors extending above said tank, one end of said pair of conductors being adapted for connection to monitoring means sensitive to a decrease in the interconductor resistance of said twisted pair,
   an enclosure impervious to said product sealingly enclosing said tank and said sensing means for preventing sensing by said sensing means of petroleum products outside said enclosure while allowing sensing thereby of petroleum product leaks from said tank, and a perforated duct disposed within said enclosure for containing said leak sensing means.

15. A system as in claim 14, wherein said enclosure is made of high density polyethylene.

16. A system as in claim 14, the air being removed from said enclosure prior to sealing.

17. A system as in claim 14, wherein said enclosure contains chemical corrosion inhibitors.

18. A system as in claim 14, in which said tank is a bare steel tank.

19. A system as in claim 14, wherein said enclosure is made of reinforced oil impervious plastic.

20. A system as in claim 14, wherein said enclosure is made of high density polyethylene.

* * * * *

UNITED STATES PATENT AND TRADEMARK OFFICE
CERTIFICATE OF CORRECTION

PATENT NO.   :   4,568,925

DATED        :   February 4, 1986

INVENTOR(S)  :   N. E. BUTTS

It is certified that error appears in the above-identified patent and that said Letters Patent is hereby corrected as shown below:

Column 10, delete lines 37-45, 48 and 49 (Claims 8-11 and 13).

Column 12, delete lines 7 and 8 (claim 20).

Signed and Sealed this

Eleventh Day of November, 1986

*Attest:*

DONALD J. QUIGG

*Attesting Officer*        *Commissioner of Patents and Trademarks*